US012670315B2

(12) United States Patent (10) Patent No.: US 12,670,315 B2
Watanabe et al. (45) Date of Patent: Jun. 30, 2026

(54) INFORMATION PROCESSING DEVICE, METHOD, COMPUTER-READABLE MEDIUM, AND SYSTEM

(71) Applicant: Wacom Co., Ltd., Saitama (JP)

(72) Inventors: Naoki Watanabe, Saitama (JP); Yutaka Kisa, Saitama (JP); Naoyuki Takasaki, Saitama (JP); Hideyuki Hara, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/403,421

(22) Filed: Jan. 3, 2024

(65) Prior Publication Data

US 2024/0143901 A1 May 2, 2024

Related U.S. Application Data

(63) Continuation of application No. PCT/JP2022/022698, filed on Jun. 6, 2022.

(30) Foreign Application Priority Data

Jul. 7, 2021 (JP) ................................. 2021-113191

(51) Int. Cl.
 *G06F 40/171* (2020.01)
 *G06F 3/0354* (2013.01)
 (Continued)
(52) U.S. Cl.
 CPC ........ *G06F 40/171* (2020.01); *G06F 3/03545* (2013.01); *G06T 11/10* (2026.01); *G06V 30/19147* (2022.01); *G06V 30/347* (2022.01)
(58) Field of Classification Search
 CPC ............. G06F 2203/0381; G06F 3/017; G06F 3/04883; G06F 3/0481; G06F 40/171;
 (Continued)

(56) References Cited

U.S. PATENT DOCUMENTS

2012/0146931 A1* 6/2012 Iida ...................... G06F 3/04186
 345/173
2014/0253463 A1* 9/2014 Hicks ...................... G06F 3/046
 345/173
(Continued)

FOREIGN PATENT DOCUMENTS

JP 2018005627 A 1/2018
JP 2019121389 A 7/2019
(Continued)

OTHER PUBLICATIONS

International Search Report dated Aug. 23, 2022, for the corresponding International Patent Application No. PCT/JP2022/022698, 5 pages. (With English Translation).

*Primary Examiner* — Sujit Shah
(74) *Attorney, Agent, or Firm* — Seed Intellectual Property Law Group LLP

(57) ABSTRACT

Provided is an information processing device including a processor, and a memory storing instructions that, when executed by the processor, cause the information processing device to: accept a cancel operation that cancels a first operation performed through an input device used for writing input, acquire learning information representing a result of learning about a relation between content of the first operation and content of a second operation performed through the input device after the cancel operation is accepted, and correct writing information representing a writing product corresponding to a third operation performed through the input device or writing setting information concerning a setting at a time of writing corresponding to the third operation, based on the learning information.

14 Claims, 11 Drawing Sheets

(51) Int. Cl.

| | | |
|---|---|---|
| *G06T 11/10* | (2026.01) | |
| *G06V 30/19* | (2022.01) | |
| *G06V 30/32* | (2022.01) | |

(58) Field of Classification Search
CPC .............. G06F 3/03545; G06V 30/347; G06V 30/19147; G06T 11/001
See application file for complete search history.

(56) References Cited

U.S. PATENT DOCUMENTS

| | | | |
|---|---|---|---|
| 2014/0333549 A1* | 11/2014 | Suemune | ............ G06F 3/04886 |
| | | | 345/173 |
| 2016/0239107 A1* | 8/2016 | Yeh | ..................... G06F 3/03545 |
| 2018/0004352 A1* | 1/2018 | Hanada | .............. G06F 3/03545 |
| 2019/0204939 A1 | 7/2019 | Ju et al. | |
| 2020/0045097 A1* | 2/2020 | AbiEzzi | .................. G06F 9/452 |
| 2020/0356254 A1* | 11/2020 | Missig | .................... G06T 13/80 |
| 2020/0371680 A1* | 11/2020 | Barel | .................... G06F 3/0354 |
| 2021/0349625 A1* | 11/2021 | Li | ........................... G06T 11/60 |

FOREIGN PATENT DOCUMENTS

| | | | |
|---|---|---|---|
| JP | 2019191837 A | 10/2019 | |
| JP | 2020024756 A | 2/2020 | |
| WO | WO 2012161223 A1 | 11/2012 | |

\* cited by examiner

AFTER LEARNING

F I G . 1 0
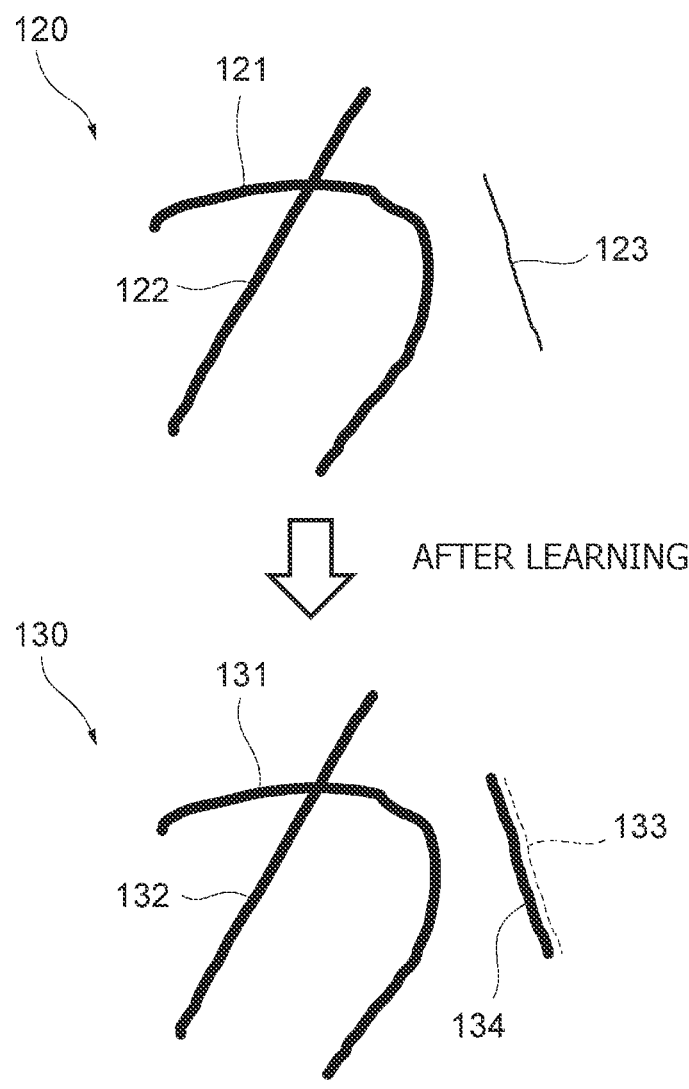
AFTER LEARNING

FIG.11
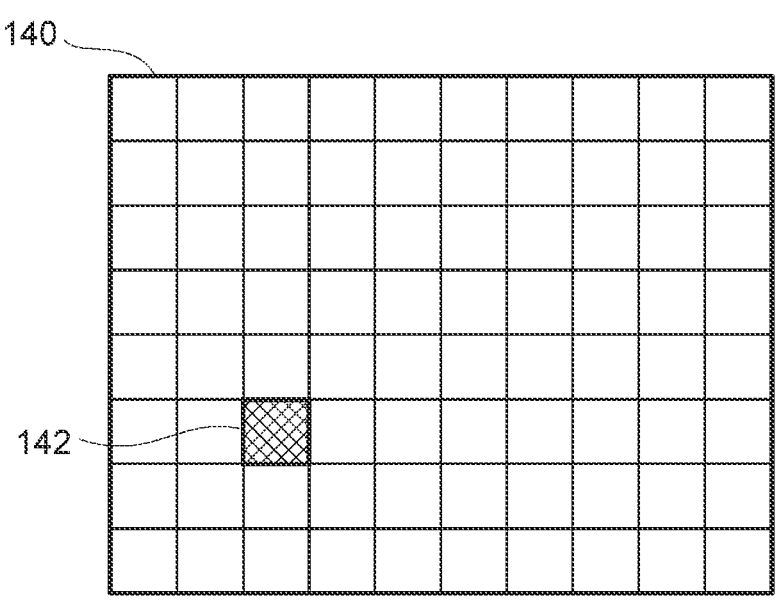
AFTER LEARNING
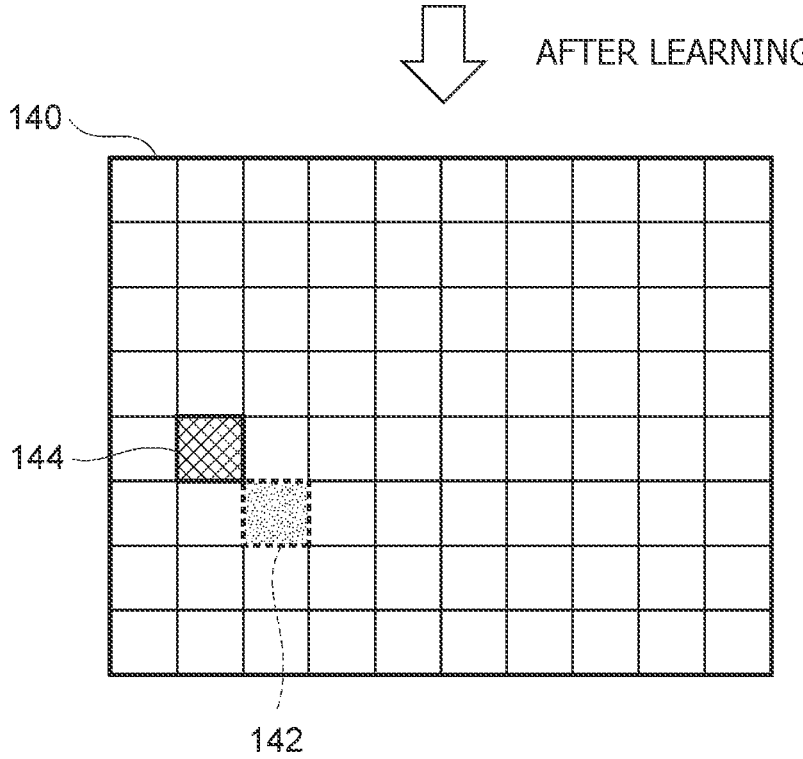

INFORMATION PROCESSING DEVICE, METHOD, COMPUTER-READABLE MEDIUM, AND SYSTEM

BACKGROUND

Technical Field

The present disclosure relates to an information processing device, an information processing method, a computer-readable medium storing an information processing program, and an information processing system.

Description of the Related Art

An information processing device for a user to input contents, such as characters and pictures, by hand has been known. For example, Japanese Patent Laid-Open No. 2020-024756 (hereinafter, referred to as Patent Document 1) discloses a method by which a user modifies hand-written data once stored in a file while checking how the hand-written data is displayed.

However, the method described in Patent Document 1 requires operations for checking and modifying the data, and involves a corresponding increase in a burden on the user.

BRIEF SUMMARY

The present disclosure has been conceived of in view of the above circumstances to provide an information processing device, an information processing method, a computer-readable medium storing an information processing program, and an information processing system which allow various types of information obtained through a writing operation with an input device to be automatically corrected at appropriate times.

An information processing device according to a first aspect of the present disclosure includes a processor; and a memory storing instructions that, when executed by the processor, cause the information processing device to: accept a cancel operation that cancels a first operation performed through an input device used for writing input, acquire learning information representing a result of learning about a relation between content of the first operation and content of a second operation performed through the input device after the cancel operation accepted by the operation acceptance section, and correct writing information representing a writing product corresponding to a third operation performed through the input device or writing setting information concerning a setting at a time of writing corresponding to the third operation, based on the learning information acquired.

An information processing method according to a second aspect of the present disclosure performed by one or a plurality of computers, include accepting a cancel operation that cancels a first operation performed through an input device used for writing input, acquiring learning information representing a result of learning about a relation between content of the first operation and content of a second operation performed through the input device after the accepted cancel operation, and correcting writing information representing a writing product corresponding to a third operation performed through the input device or writing setting information concerning a setting at a time of writing corresponding to the third operation, based on the learning information.

A non-transitory computer-readable medium according to a third aspect of the present disclosure stores an information processing program that, when executed by one or more computers, causes the one or more computers to: accept a cancel operation that cancels a first operation performed through an input device used for writing input, acquire learning information representing a result of learning about a relation between content of the first operation and content of a second operation performed through the input device after the cancel operation is accepted, and correct writing information representing a writing product corresponding to a third operation performed through the input device or writing setting information concerning a setting at a time of writing corresponding to the third operation, based on the learning information.

An information processing system according to a fourth aspect of the present disclosure includes the information processing device according to the first aspect of the present disclosure, and a server device that, in operation, transmits the learning information toward the information processing device in response to a request from the information processing device.

The first to fourth aspects of the present disclosure allow various types of information obtained through a writing operation with the input device to be automatically corrected at appropriate times.

BRIEF DESCRIPTION OF THE SEVERAL VIEWS OF THE DRAWINGS

FIG. 10 is a diagram illustrating a third specific example concerning the correcting operation; and FIG. 11 is a diagram illustrating a fourth specific example concerning the correcting operation.

DETAILED DESCRIPTION

Figure 1:
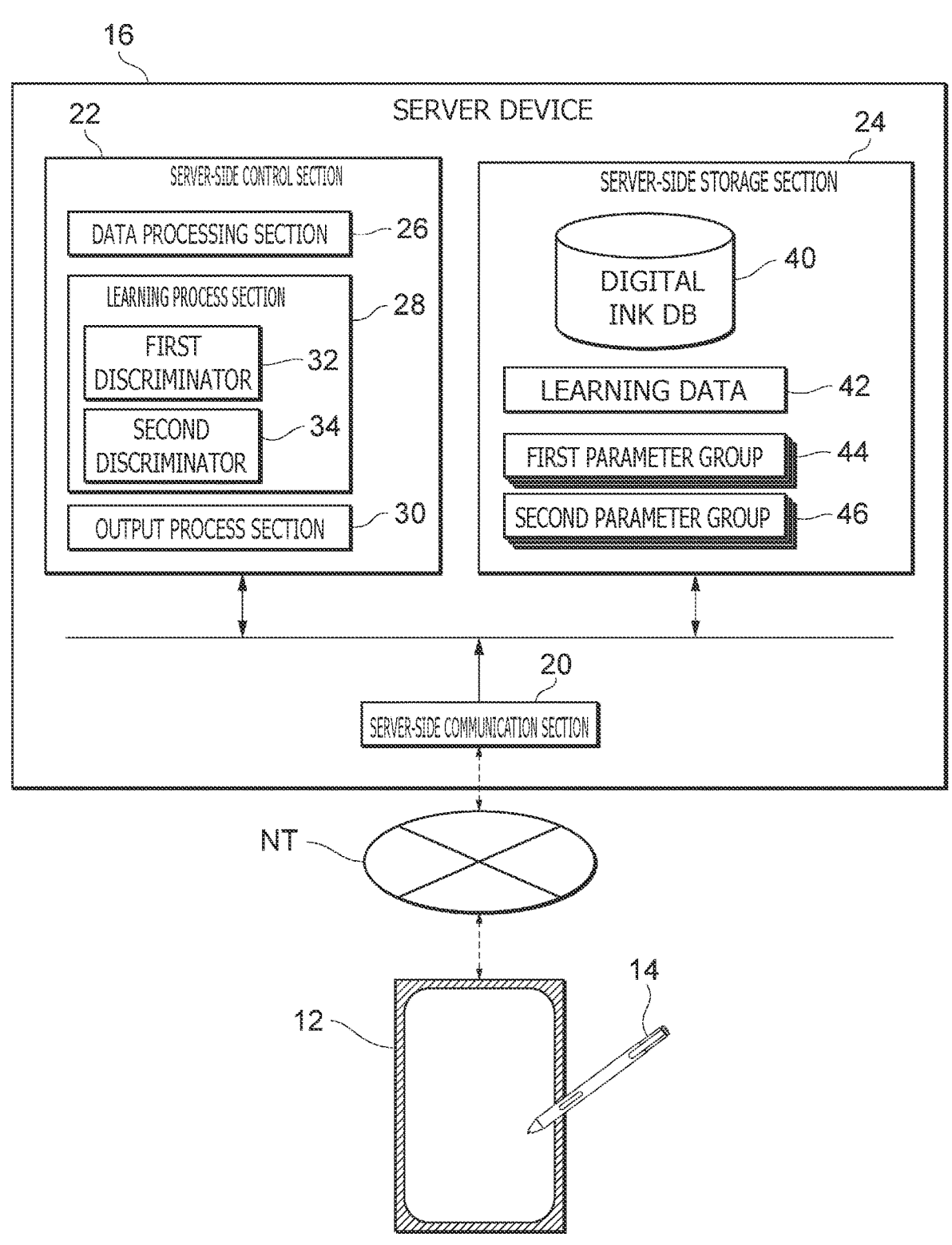
FIG. 1 is an overall configuration diagram of an information processing system according to an embodiment of the present disclosure.

Hereinafter, embodiments of the present disclosure will be described with reference to the accompanying drawings. In the accompanying drawings, to make it easier to understand the following description, like constituent elements are denoted by like reference characters wherever possible, and redundant description will be omitted.

Overall Configuration of Information Processing System 10

FIG. 1 is an overall configuration diagram of an information processing system 10 according to an embodiment of the present disclosure. The information processing system 10 is provided to provide an "input support service" for supporting a user in performing a writing input. This information processing system 10 specifically includes one or a plurality of user devices 12 (corresponding to an "information processing device"), one or a plurality of electronic pens 14 (corresponding to an "input device"), and a server device 16.

The user device 12 is a computer owned by a user of the input support service, and has a function of detecting a position indicated by the electronic pen 14. The user device 12 is formed by, for example, a tablet computer, a smart phone, a personal computer, or the like.

The electronic pen 14 is a pen-type pointing device, and is configured to be capable of one-way or two-way communication with the user device 12. The electronic pen 14 is, for example, a stylus of an active capacitance type (AES) or an electromagnetic induction type (EMR). The user is able to draw pictures, characters, etc., on the user device 12 by holding the electronic pen 14 and moving the electronic pen 14 with a pen point thereof put onto a touch surface of the user device 12.

The server device 16 is a computer that performs centralized control related to the support in writing input, and may be either of a cloud type or an on-premises type. Here, the server device 16 is depicted as a single computer in the figure, but the server device 16 may alternatively be implemented as a group of computers that form a distributed system. The server device 16 specifically includes a server-side communication section 20, a server-side control section 22, and a server-side storage section 24.

The server-side communication section 20 is an interface for transmitting and receiving electrical signals to and from an external device. The server device 16 is thus capable of acquiring a digital ink 76 (see FIG. 2) from the user device 12, and of supplying a second parameter group 46 generated by the server device 16 to the user device 12.

The server-side control section 22 is formed by a processor including a central processing unit (CPU) or a graphics processing unit (GPU). The server-side control section 22 functions as a data processing section 26, a learning process section 28, and an output process section 30 by reading and executing a program and data stored in the server-side storage section 24.

The data processing section 26 processes the digital ink 76 (see FIG. 2) generated by the user device 12 to generate learning data 42, which will be described below. An operation of the data processing section 26 will be described in detail below with reference to a flowchart of FIG. 3.

Using the learning data 42 generated by the data processing section 26, the learning process section 28 performs a learning process with respect to a first discriminator 32 and a second discriminator 34. An operation of the learning process section 28 will be described in detail below with reference to a flowchart of FIG. 4.

The output process section 30 outputs or transmits, toward the user device 12, the second parameter group 46 (see FIG. 2) obtained as a result of the learning process performed by the learning process section 28. As a result, the user device 12 is able to use the second discriminator 34 through the second parameter group 46 customized to suit the user thereof.

The server-side storage section 24 stores a program and data required for the server-side control section 22 to control constituent elements. The server-side storage section 24 is formed by a non-transitory computer-readable storage medium. Here, examples of such a computer-readable storage medium include 1) storage devices such as a hard disk drive (HDD) and a solid-state drive (SSD), contained in a computer system, and 2) portable media such as a magneto-optical disk, a read-only memory (ROM), a compact disc (CD)-ROM, and a flash memory.

In the server-side storage section 24, a database (hereinafter referred to as a digital ink DB 40) related to the digital inks 76 (see FIG. 2), which will be described below, is constructed, and the learning data 42, one or a plurality of first parameter groups 44, and one or a plurality of second parameter groups 46 (corresponding to "learning information") are stored.

The learning data 42 is a collection of pieces of data used in machine learning performed by the learning process section 28. Examples of the learning data 42 include 1) a set of feature amounts concerning a unit writing operation, 2) a state vector representing a state space when a writing operation is performed, and 3) the type of an event.

Here, operations are classified into a first operation, a second operation, and a third operation. Each of the first to third operations is an operation performed through an input device used for writing input. The first operation corresponds to an operation that has been canceled by a cancel operation. The second operation corresponds to an operation that has been performed after the cancel operation and which has not been canceled thereafter. The third operation corresponds to an operation that is identical or similar to the first operation and which may therefore be canceled. In the case where the input device is the electronic pen 14, for example, a unit operation is a whole operation performed from a pen-down operation to a pen-up operation.

Examples of sets of feature amounts include 1) "stroke feature amounts," examples of which include coordinate values, pen pressure values, slant angles, etc., when a stroke is drawn, 2) "conditions set in a device driver," examples of which include identification information (e.g., a pen identifier (ID)) and type of an input device, the type of the user device 12, and the shape of a pen pressure curve, and 3) "conditions set in a drawing application," examples of which include the type of content, color information of a color palette and a brush, and setting of visual effects. In addition, the state vector includes a set of feature amounts concerning one or a plurality of writing operations performed in the past.

The first parameter group 44 is a collection of learning parameters for identifying an algorithm of the first discriminator 32. The second parameter group 46 is a collection of learning parameters capable of identifying an algorithm of the second discriminator 34. The learning parameters may include, for example, a coefficient describing an activation function of a computation unit, a weighting coefficient corresponding to strength of synaptic junction, the number of computation units constituting each of layers, the number of intermediate layers, and so on.

The first parameter group 44 or the second parameter group 46 may be the same for all users, or may be customized on a user-by-user basis. In the latter case, it is desirable that the first parameter group 44 or the second parameter group 46 is stored in advance so as to be associated with identification information capable of identifying the user, and is read as appropriate with use of the identification information included in the digital ink 76 (see FIG. 2). Examples of the identification information used here include a user account of the input support service, and various types of IDs related to the electronic pen 14 or the user device 12.

Figure 2:
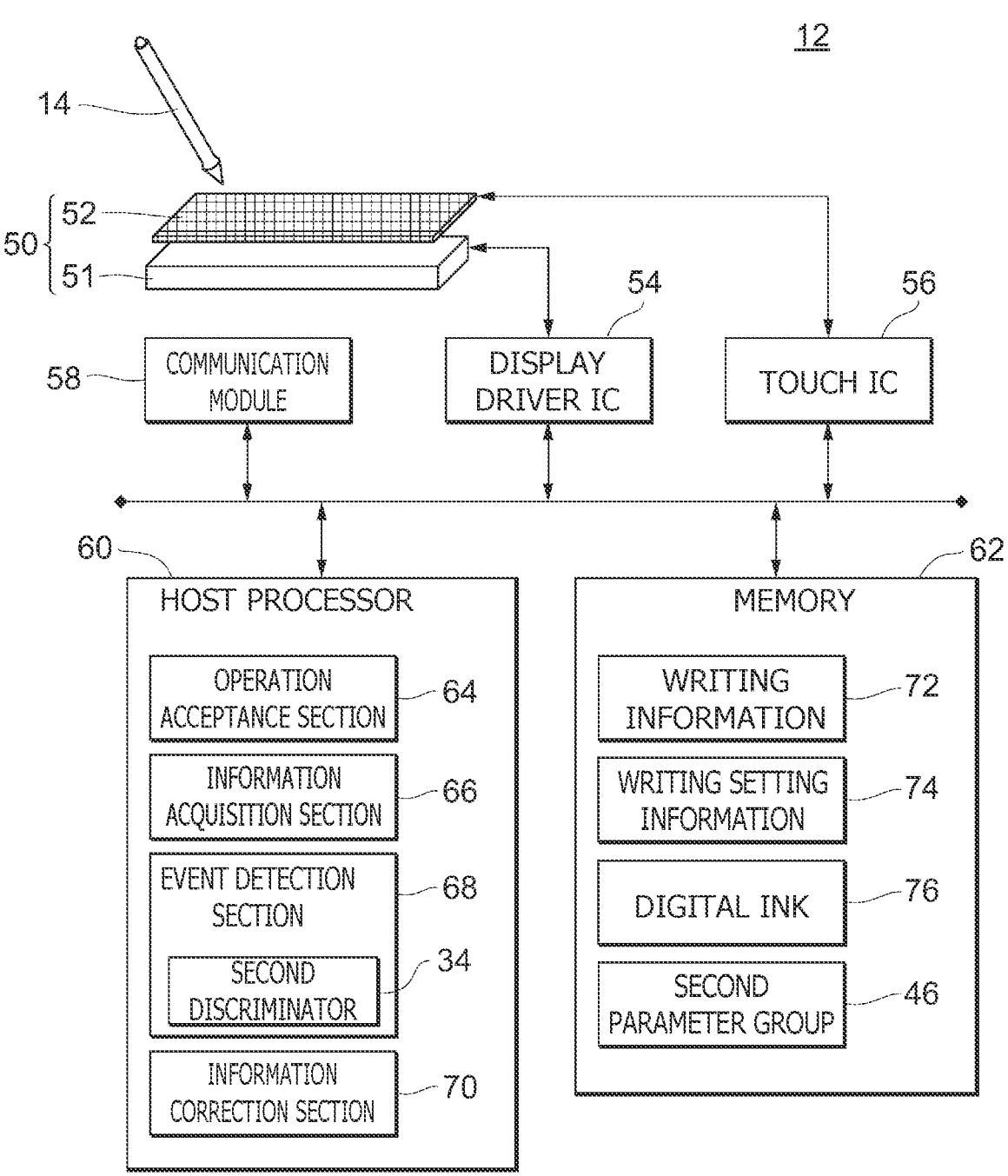
FIG. 2 is a block diagram illustrating an example of a configuration of a user device illustrated in FIG. 1.

FIG. 2 is a block diagram illustrating an example of a configuration of the user device 12 illustrated in FIG. 1. The user device 12 specifically includes a touchscreen display 50, a display driver integrated circuit (IC) 54, a touch IC 56, a communication module 58, a host processor 60 (corresponding to a "processor"), and a memory 62 (corresponding to a "storage medium").

The touchscreen display 50 includes a display panel 51 capable of displaying visible content, and a sheet-type touch sensor 52 disposed so as to overlap with the display panel 51 in a plan view. In the example of this figure, the touch sensor 52 is an "external" sensor external to and attached to the display panel 51, but a "built-in" (more specifically, "on-cell" or "in-cell") sensor integrated with the display panel 51 may alternatively be used.

The display panel 51 is capable of displaying a black-and-white image or a color image, and may be formed by, for example, a liquid crystal panel, an organic electro-luminescence (EL) panel, or an electronic paper. Note that, when the display panel 51 is flexible, the user is able to perform various writing operations with the touch surface of the user device 12 being curved or bent.

The touch sensor 52 is a capacitive sensor having a plurality of sensor electrodes disposed in a planar arrangement. The touch sensor 52 includes, for example, a plurality of X-line electrodes for detecting positions along an X-axis of a sensor coordinate system, and a plurality of Y-line electrodes for detecting positions along a Y-axis thereof. In this case, the X-line electrodes are each arranged to extend in the Y-axis direction, and are arranged at regular intervals in the X-axis direction. The Y-line electrodes are each arranged to extend in the X-axis direction, and are arranged at regular intervals in the Y-axis direction. Note that the touch sensor 52 may alternatively be a self-capacitance sensor having block-type electrodes disposed in a two-dimensional grid pattern, instead of a mutual capacitance sensor as described above.

The display driver IC 54 is an integrated circuit that is electrically connected to the display panel 51, and which performs drive control on the display panel 51. The display driver IC 54 drives the display panel 51 on the basis of display signals supplied from the host processor 60. Content represented by the digital ink 76 is thus displayed on the display panel 51.

The touch IC 56 is an integrated circuit that is electrically connected to the touch sensor 52, and which performs drive control on the touch sensor 52. The touch IC 56 drives the touch sensor 52 on the basis of control signals supplied from the host processor 60. The touch IC 56 thus implements a "pen detection function" of detecting the state of the electronic pen 14, and a "touch detection function" of detecting a touch made by a finger of the user or the like.

Examples of the pen detection functions include a function of scanning the touch sensor 52, a function of receiving and analyzing a downlink signal, a function of estimating the state (e.g., position, posture, pen pressure, etc.) of the electronic pen 14, and a function of generating and transmitting an uplink signal including a command for the electronic pen 14. Meanwhile, examples of the touch detection functions include a function of two-dimensionally scanning the touch sensor 52, a function of acquiring a detection map on the touch sensor 52, and a function of classifying regions (e.g., classifying a finger, a palm, etc.) on the detection map.

Thus, a graphical user interface (GUI) is constructed by combining an input function implemented by the electronic pen 14 and the touch sensor 52 and an output function implemented by the display panel 51.

The communication module 58 has a communication function of performing wired communication or wireless communication with an external device. This enables the user device 12 to transmit the digital ink 76 to the server device 16, and to receive the second parameter group 46 from the server device 16.

The host processor 60 is formed by a processing device including a CPU, a GPU, or a micro-processing unit (MPU). The host processor 60 functions as an operation acceptance section 64, an information acquisition section 66, an event detection section 68, and an information correction section 70 by reading and executing a program and data stored in the memory 62.

The operation acceptance section 64 accepts an operation performed by the user through the input device (e.g., the electronic pen 14) used for writing input. Through such an operation, various drawing functions can be performed, examples of the various drawing functions including 1) writing functions including generation of a stroke, 2) setting functions related to color, thickness, decoration, etc., of a stroke, and 3) editing functions including canceling of an operation, copying of an object, a change of layout, and saving of data. Examples of an operation (hereinafter referred to as a "cancel operation") for canceling an operation performed in the past include an "undo operation" that cancels an immediately previous operation or an "erase operation" that erases at least a portion of a drawn object. Note that the cancel operation may cancel a one-time operation, or may cancel a portion or whole of multiple operations.

Operations performed by the user include 1) operations performed on the electronic pen 14, and 2) operations performed on the user device 12 with use of the electronic pen 14. Examples of the former operations include a pen-down operation, a pen-move operation, a pen-up operation, and an erase operation via the electronic pen 14, an operation of pressing a switch provided on the electronic pen 14, and the like. Examples of the latter operations include an operation performed on a user control (e.g., a window, a button, a palette, etc.) displayed on the touchscreen display 50, and the like.

The information acquisition section 66 acquires information (hereinafter referred to as "learning information") representing a result of learning about a relation between the content of the first operation performed through the input device and the content of the second operation performed through the input device after the cancel operation accepted by the operation acceptance section 64. The information acquisition section 66 may acquire the learning information either by reading the learning information stored in the memory 62 or by downloading the learning information from an external device, e.g., the server device 16. In addition, the information acquisition section 66 may acquire learning information corresponding to the identification information (i.e., the pen ID) of the electronic pen 14.

The event detection section 68 detects whether or not an event for which the cancel operation may be performed has occurred and the type of any detected event from the current state of writing through the input device. This detection of an event is performed through the second discriminator 34, which is constructed according to the learning information acquired by the information acquisition section 66. The types of events are classified into 1) events caused by an erroneous operation, and 2) events caused by a habit, illusion, or mistaken recognition of the user. Examples of the former include miswriting of a straight line, a curve, a figure, a symbol, or the like, and inconsistency in stroke positions or pen pressure. Examples of the latter include timing error in pressing a switch, a mistaken selection of a color in a color palette, and an unwanted operation performed as a result of a habit.

In the case where the event detection section 68 has detected a predetermined event, the information correction section 70 corrects writing information 72 or writing setting information 74 corresponding to the third operation according to the type of the event. That is, in the case where the third operation, which is identical or similar to the first operation and which may be canceled, has been performed, the writing information 72 or the writing setting information 74 is automatically corrected as if an operation similar to the second operation were performed. Specific examples of the correcting operation will be described in detail below with reference to FIGS. 8 to 11.

As is the case with the server-side storage section 24 (see FIG. 1), the memory 62 is formed by a non-transitory computer-readable storage medium. In the example of the present figure, the writing information 72, the writing setting information 74, the digital ink 76, and the aforementioned second parameter group 46 are stored in the memory 62.

The writing information 72 is information representing a writing product corresponding to an operation performed through the input device. Examples of the writing information 72 include stroke data including coordinate values, pen pressure values, slant angles, etc., when a stroke is drawn.

The writing setting information 74 is information concerning a setting at the time of writing corresponding to an operation performed through the input device. Examples of the writing setting information 74 include "conditions set in a device driver," examples of which include a device ID, a device type, the type of the user device 12, and the shape of a pen pressure curve; and "conditions set in a drawing application," examples of which include the type of content, color information of a color palette and a brush, and setting of visual effects.

The digital ink 76 is ink data for representing handwritten content. Examples of the data format, i.e., what is generally called an "ink markup language," of the digital ink 76 include Wacom Ink Layer Language (WILL), Ink Markup Language (InkML), and Ink Serialized Format (ISF). The digital ink 76 has a data structure in which 1) document metadata (document metadata), 2) semantic data (ink semantics), 3) device data (devices), 4) stroke data (strokes), 5) grouping data (groups), and 6) context data (contexts) are arranged in order.

The stroke data is data for describing an individual stroke constituting content. Each stroke is described by a plurality of pieces of point data sequentially arranged in <trace> tags. The pieces of point data are each made up of at least an indicated position (X-coordinate, Y-coordinate), and are separated by a delimiter, such as a comma. For the sake of convenience in illustration, only pieces of point data that represent a starting point and an ending point of each stroke are depicted, while pieces of point data that represent a plurality of intermediate points are omitted. The pieces of point data may include, in addition to the aforementioned indicated positions, the order of writing, the pen pressure and/or posture of the electronic pen 14, and/or the like.

Operation of Information Processing System 10

The information processing system 10 according to this embodiment has the above-described configuration. Next, an operation of the information processing system 10 will be described below with reference to FIGS. 3 to 7.

1. Generation of Digital Ink 76

First, an operation of generating the digital ink 76, which is performed by the user device 12 illustrated in FIG. 1, will be described below with reference to FIGS. 1 and 2.

The user, using the electronic pen 14 owned by the user, performs a writing input on the user device 12. The operation acceptance section 64 (see FIG. 2) of the user device 12 accepts operations performed by the user sequentially, whereby the writing information 72 and the writing setting information 74 are generated. Then, when the operation acceptance section 64 accepts an operation for data saving, the host processor 60 generates the digital ink 76 including the writing information 72 and the writing setting information 74, and causes the digital ink 76 to be stored in the memory 62.

Thereafter, the user device 12 transmits the digital ink 76 generated in the user device 12 itself to the server device 16. Then, the server-side control section 22 causes the digital ink 76, received via the server-side communication section 20, to be stored in the server-side storage section 24. The new digital ink 76 is thus added to and registered in the digital ink DB 40.

2. Generation of Learning Data 42

Next, an operation of generating the learning data 42, which is performed by the server device 16 illustrated in FIG. 1, will be described below with reference to the flowchart of FIG. 3 and FIG. 1. The acts illustrated in FIG. 3 are performed by the data processing section 26 of the server device 16.

Figure 3:
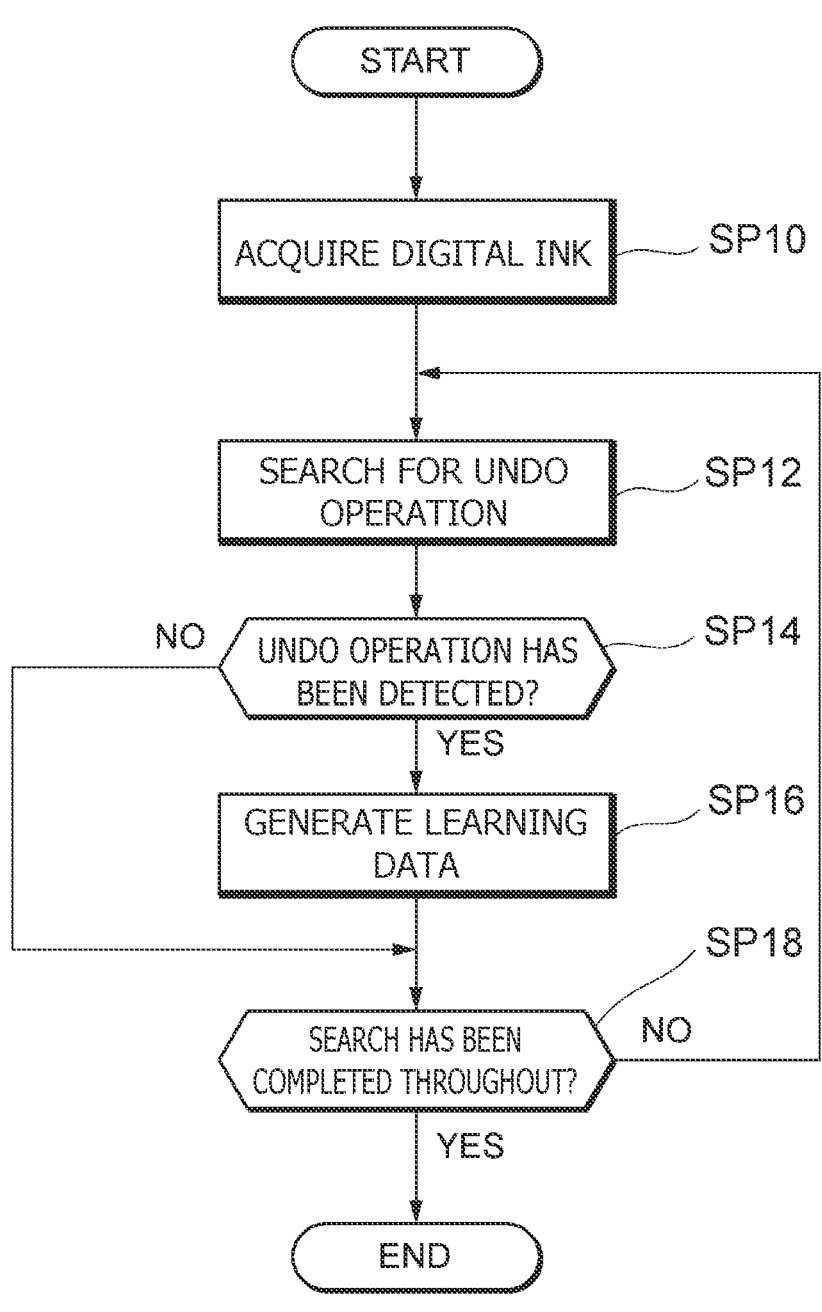
FIG. 3 is a flowchart illustrating an example operation in which a server device illustrated in FIG. 1 generates learning data.

At SP10 in FIG. 3, the data processing section 26 of the server device 16 refers to the digital ink DB 40, and acquires the digital ink 76 to be analyzed.

At SP12, the data processing section 26 analyzes the digital ink 76 acquired at SP10, and searches for an instruction code indicative of an undo operation.

At SP14, the data processing section 26 checks whether or not an undo operation has been detected by the search at SP12. In the case where an undo operation has not been detected (SP14: NO), the data processing section 26 skips SP16. Meanwhile, in the case where an undo operation has been detected (SP14: YES), the data processing section 26 proceeds to SP16.

At SP16, the data processing section 26 acquires and processes peripheral data relevant to the undo operation detected at SP14 to generate the learning data 42.

At SP18, the data processing section 26 checks whether or not data search throughout the digital ink 76 has been completed. In the case where the data search has not been completed yet (SP18: NO), the data processing section 26 returns to SP12, and repeatedly performs SP12 to SP18 sequentially until the search throughout the digital ink 76 is completed. Meanwhile, in the case where the data search throughout the digital ink 76 has been completed (SP18: YES), the data processing section 26 finishes the procedure of the flowchart illustrated in FIG. 3.

3. Learning for Second Discriminator 34

Next, an operation in which the server device 16 illustrated in FIG. 1 performs learning with respect to the second discriminator 34 will be described below with reference to the flowchart of FIG. 4 and FIGS. 5 and 6.

Figure 4:
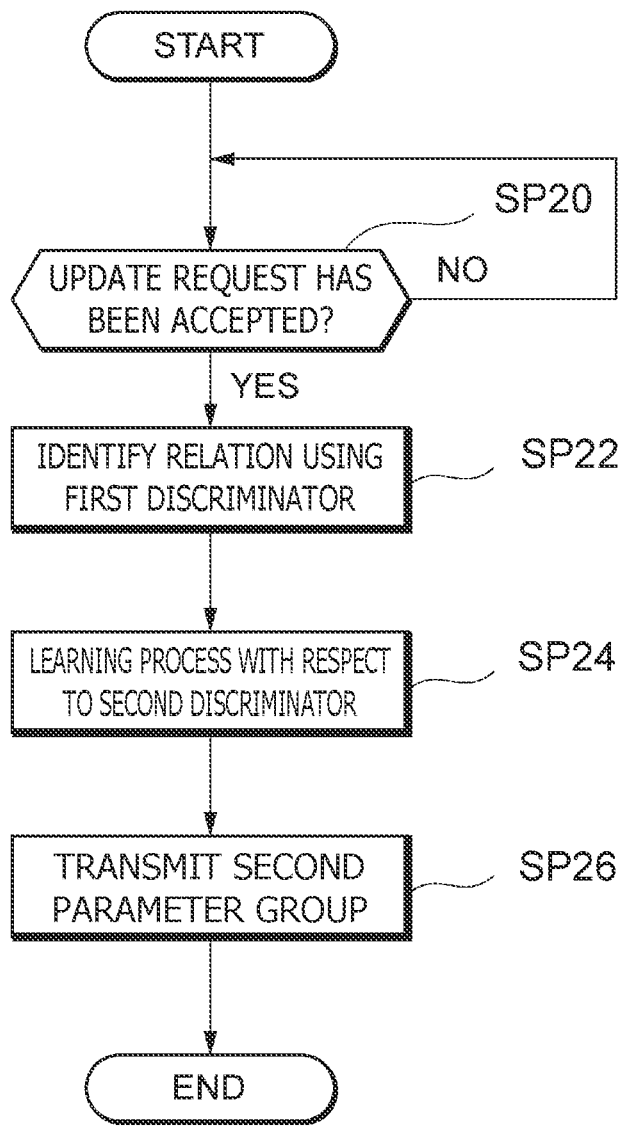
FIG. 4 is a flowchart illustrating an example operation in which the server device illustrated in FIG. 1 performs learning with respect to a second discriminator.

At SP20 in FIG. 4, the server-side control section 22 (see FIG. 1) of the server device 16 checks whether or not an update request from a particular user has been accepted. In the case where the first discriminator 32 or the second discriminator 34 is customized on a user-by-user basis, the learning process section 28 acquires learning data 42 corresponding to identification information (e.g., a pen ID) that identifies the user.

At SP22, the learning process section 28 of the server device 16 identifies the relation between the first operation and the second operation with use of the first discriminator 32 and the learning data 42 acquired at SP20.

Figure 5:
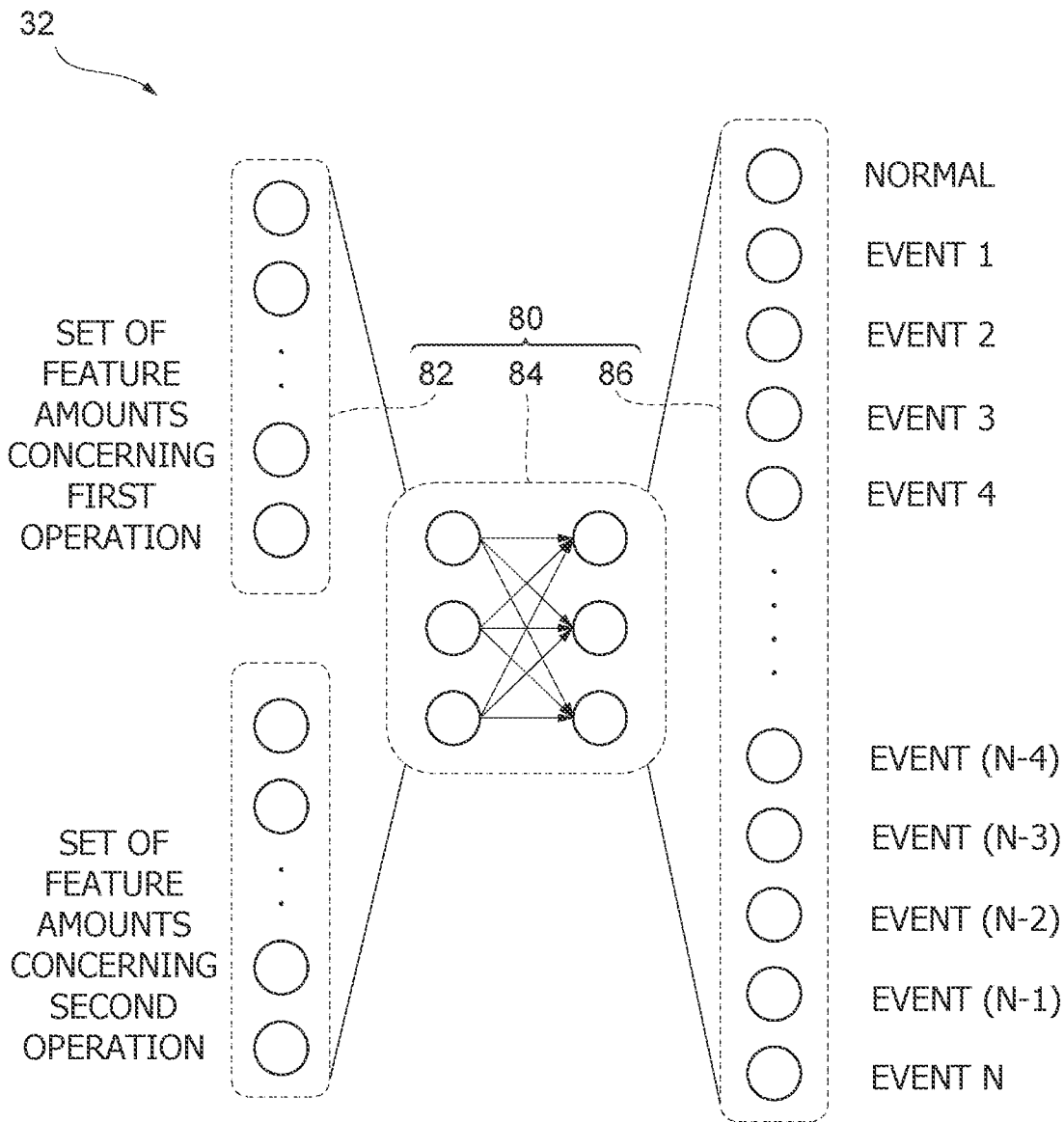
FIG. 5 is a diagram illustrating an example network structure of a first discriminator.

FIG. 5 is a diagram illustrating an example network structure of the first discriminator 32. The first discriminator 32 is formed by, for example, a hierarchical neural network 80, and includes an input layer 82, an intermediate layer 84, and an output layer 86. The algorithm of the first discriminator 32 is determined by values of the first parameter group 44 (see FIG. 1), which is a collection of learning parameters.

The input layer 82 is a layer at which sets of feature amounts concerning the first operation and the second operation are inputted, and is made up of a plurality of (for example, 2·m) computation units.

The intermediate layer 84 is made up of one or more layers, and has a dimensionality reduction function of reducing the dimensionality of an input vector. Therefore, it is desirable that the number of computation units that constitute the intermediate layer 84 is smaller than 2·m.

The output layer 86 is a layer at which a group of event labels is outputted, and, in the example of the present figure, is made up of (N+1) computation units. A label "event n" (n=1, . . . , N) represents a situation in which an nth event has occurred, and a label "normal" represents a situation in which no event has occurred. In the case where an activation function of each computation unit is a softmax function, this label group is an output vector having (N+1) components each representing the probability of occurrence of the corresponding event. That is, in the case where there is a label (hereinafter referred to as a particular label) that has the greatest label value, it is determined that the event corresponding to the particular label has occurred at the first operation.

At SP24 in FIG. 4, the learning process section 28 performs a learning process with respect to the second discriminator 34 with use of the learning data 42 acquired at SP20 and the type of the event identified at SP22. This learning process is performed employing any of various methods that are commonly applied to machine learning. Through this learning process, the second parameter group 46 customized on a user-by-user basis is calculated.

Figure 6:
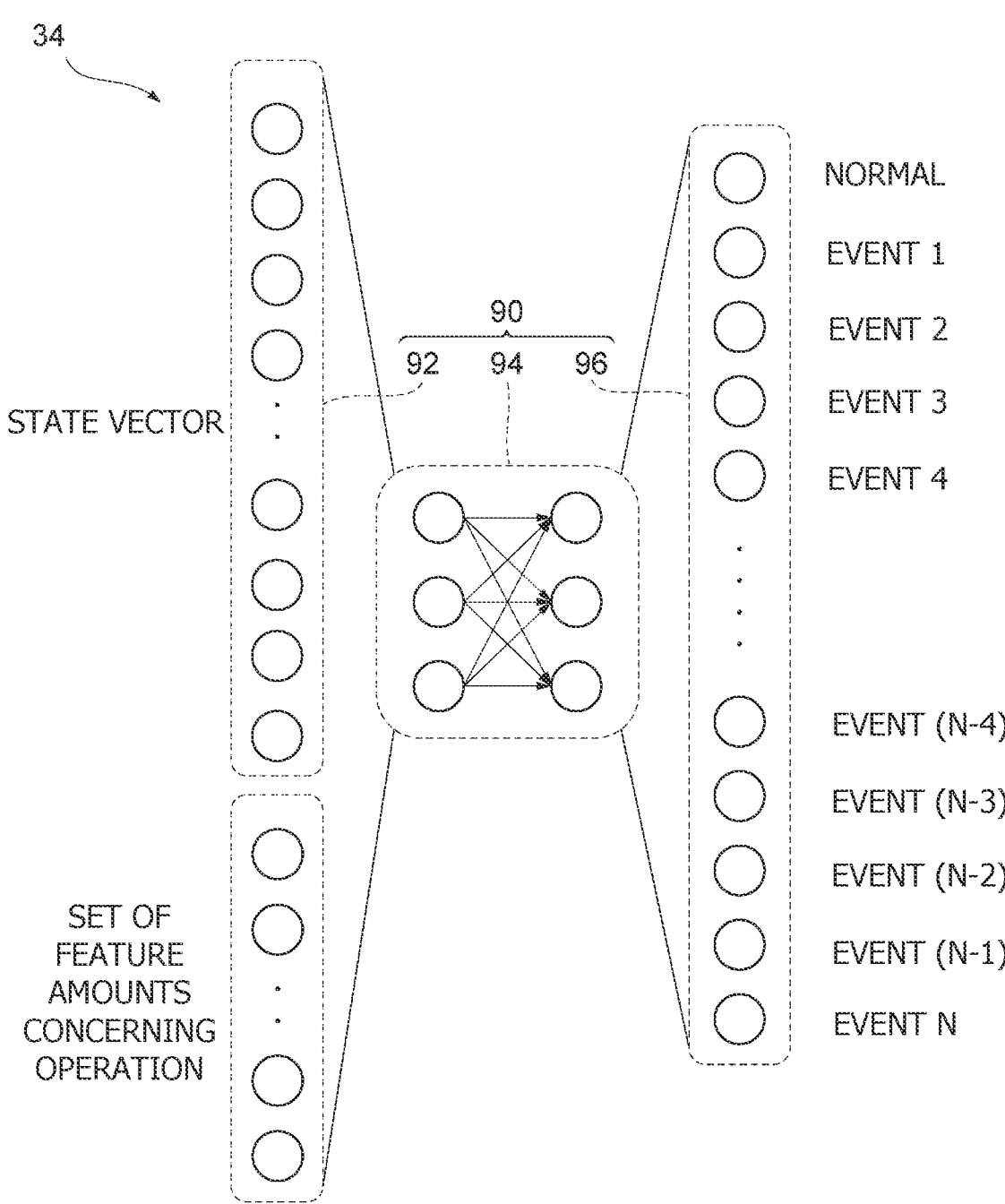
FIG. 6 is a diagram illustrating an example network structure of the second discriminator.

FIG. 6 is a diagram illustrating an example network structure of the second discriminator 34. The second discriminator 34 is formed by, for example, a hierarchical neural network 90, and includes an input layer 92, an intermediate layer 94, and an output layer 96. The algorithm of the second discriminator 34 is determined by values of the second parameter group 46 (see FIG. 1), which is a collection of learning parameters.

The input layer 92 is a layer at which a state vector at the time of an operation and a set of feature amounts concerning the operation are inputted, and is made up of a plurality of (for example, (M+m)) computation units.

The intermediate layer 94 is made up of one or more layers, and has the dimensionality reduction function of reducing the dimensionality of an input vector. Therefore, it is desirable that the number of computation units that constitute the intermediate layer 94 is smaller than (M+m).

The output layer 96 is a layer at which a group of event labels is outputted, and, in the example of the present figure, is made up of (N+1) computation units. A one-hot vector in which a vector component corresponding to the event identified at SP22 is "1" while the other vector components are "0" is used as a correct answer of teacher data.

At SP26 in FIG. 4, the server-side communication section 20 of the server device 16 transmits the second parameter group 46, which is calculated through the learning process at SP24, toward the user device 12 that has made the update request. The user device 12 stores the received second parameter group 46 in the memory 62 to enable construction of the second discriminator 34 in a device environment of the user device 12 itself. The server device 16 thus finishes the procedure of the flowchart illustrated in FIG. 4.

4. Automatic Correction of Operation

Next, an operation of the user device 12, which forms a portion of the information processing system 10, more specifically, an operation of correcting an operation, will be described below with reference to a flowchart of FIG. 7.

Figure 7:
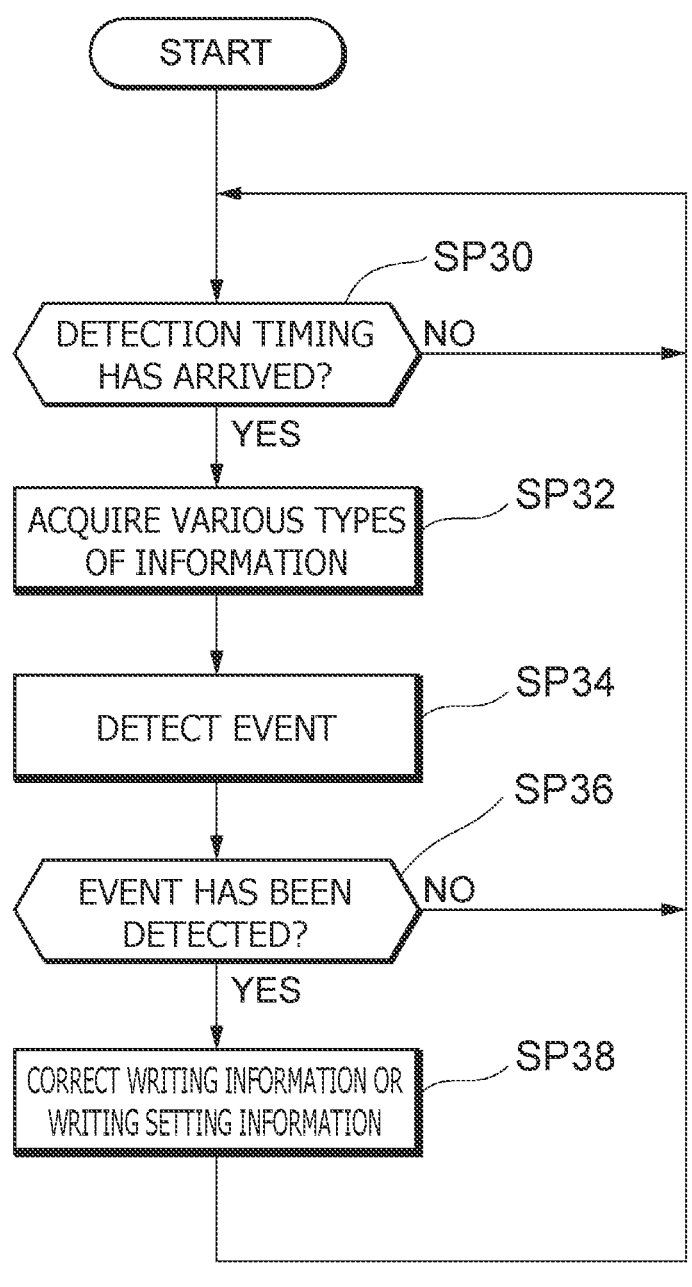
FIG. 7 is a flowchart illustrating an example operation in which the user device illustrated in FIGS. 1 and 2 corrects various types of information.

At SP30 in FIG. 7, the event detection section 68 checks whether or not timing of event detection has arrived. The detection timing may be, for example, at a time when one writing operation has been completed. In the case where the detection timing has not arrived yet (SP30: NO), control stays at SP30 until arrival of the detection timing. Meanwhile, in the case where the detection timing has arrived (SP30: YES), control proceeds to SP32.

At SP32, the event detection section 68 acquires various types of information (here, the writing information 72 and the writing setting information 74) for identifying an event.

At SP34, the event detection section 68 detects whether or not an event has occurred and the type of any detected event from the writing information 72 and the writing setting information 74 acquired at SP32. This detection process is performed through the second discriminator 34, which has been trained for the user.

At SP36, the information correction section 70 refers to a result of the detection at SP34 to check whether or not an event has been detected. In the case where no event has been detected (SP36: NO), control returns to SP30 without the information correction section 70 correcting the writing information 72 or the writing setting information 74. Meanwhile, in the case where an event has been detected (SP36: YES), control proceeds to SP38.

At SP38, the information correction section 70 corrects the writing information 72 or the writing setting information 74 according to the type of the event detected at SP34. Specific examples of the correction will be described in detail below with reference to FIGS. 8 to 11.

Thereafter, returning to SP30, the host processor 60 repeats SP30 to SP38 while the user is performing writing operations, and various types of information are corrected as necessary. The processes in the flowchart illustrated in FIG. 7 are sequentially performed in the above-described manner.

Specific Examples of Correcting Operation

First Example

In the case where each of the first to third operations is a switch operation of pressing a switch 14s for changing a setting at the time of writing, the information correction section 70 may correct the writing setting information 74 such that an event that accompanies the switch operation will start earlier or later than a time when the switch operation is performed.

Figure 8:
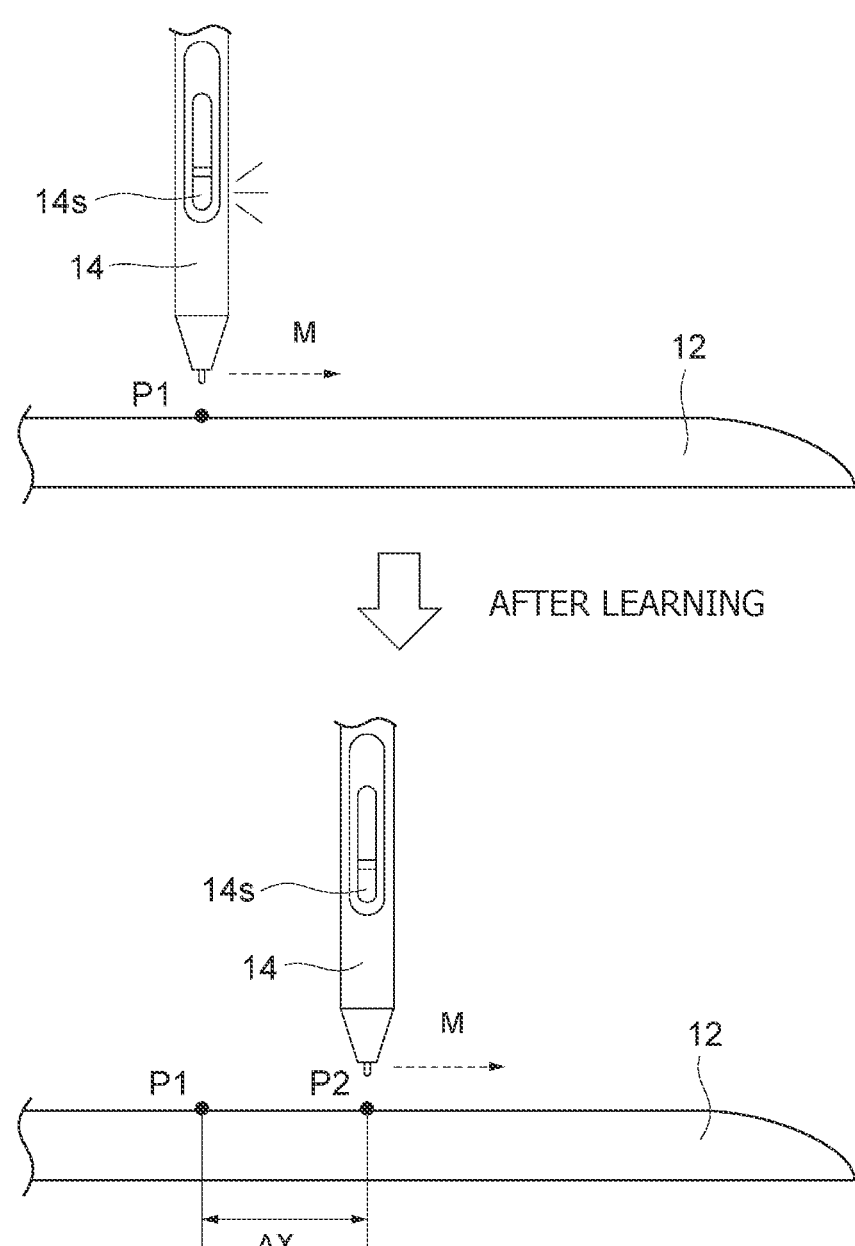
FIG. 8 is a diagram illustrating a first specific example concerning a correcting operation.

FIG. 8 is a diagram illustrating a first example concerning the correcting operation. This first example concerns an operation on the switch 14s, which is provided on a side surface of the electronic pen 14. Suppose, for example, a case where a certain user has the habit of pressing the switch 14s early. The user has a tendency to press the switch 14s too early at a position P1 while moving the electronic pen 14 in a direction indicated by an arrow M. Moreover, because the level of the touch surface and the level of the touch sensor 52 are slightly different from each other in the touchscreen display 50 (see FIG. 2) of the user device 12, timing error in performing an operation can occur due to a parallax of the user.

Thus, if the user performs a similar operation in the situation illustrated in FIG. 8 after learning concerning the aforementioned habit or illusion of the user is performed, an event of "timing error in pressing" is detected by the event detection section 68. As a result, the information correction section 70 corrects the writing setting information 74 such that the operation of pressing the switch 14s will be effective at a position P2, which lies downstream of the position P1 in the direction indicated by the arrow M, even when the switch 14s has been pressed at the position P1. This enables the user to proceed to a next writing operation without performing the undo operation.

Second Example

In the case where each of the first to third operations is a stroke operation of drawing a stroke, and the writing information 72 includes a set of coordinate values representing a change over time of the position indicated by the electronic pen 14, the information correction section 70 may correct the set of coordinate values such that inconsistency in positions of the same stroke is reduced or minimized.

Figure 9:
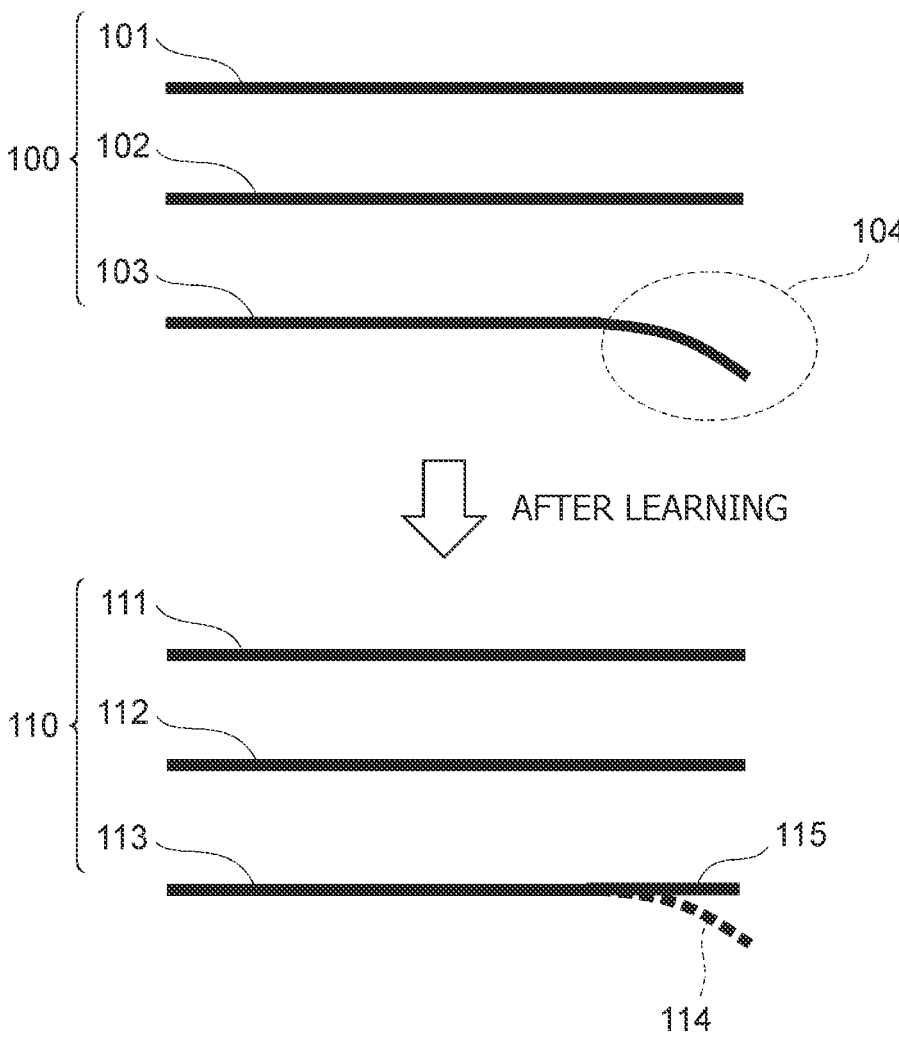
FIG. 9 is a diagram illustrating a second specific example concerning the correcting operation.

FIG. 9 is a diagram illustrating a second example concerning the correcting operation. This second example concerns an operation of drawing a plurality of strokes sequentially with use of the electronic pen 14. Suppose, for example, a case where a certain user is not good at drawing an object 100 composed of a plurality of parallel lines. When drawing strokes 101, 102, and 103 in order from the top while moving the electronic pen 14, the user has a tendency to curve an end portion 104 of the lowest stroke downward.

Thus, if the user performs a similar operation in the situation illustrated in FIG. 9 after learning concerning the aforementioned erroneous operation by the user is performed, an event of "inconsistency in positions of a stroke" is detected by the event detection section 68. As a result, if the user, when drawing strokes 111, 112, and 113 that constitute an object 110, curves an end portion 114 of the stroke 113 downward, the information correction section 70 corrects the writing information 72 such that an end portion 115 of the stroke 113 will be straight. This enables the user to proceed to a next writing operation without performing the undo operation.

Note that, although the second example described above assumes the case where the inconsistency in positions of a stroke is reduced or minimized through a change in a locus, the change in the locus may not necessarily be involved in this process. For example, in the case where discrete data of coordinate values is converted into continuous data through interpolation, the information correction section 70 may reduce or minimize the inconsistency in positions of the stroke by using a smoother interpolation function to obtain the continuous data. Also note that a method for smoothing the stroke is not limited to using the interpolation function, and that repetitive execution of an averaging process, thinning out of coordinate values, etc., may alternatively be employed.

Third Example

In the case where each of the first to third operations is a stroke operation of drawing strokes, and the writing information 72 includes a set of pen pressure values representing a change over time of pen pressure acting on the electronic pen 14, the information correction section 70 may correct the set of pen pressure values such that inconsistency in the level of the pen pressure between the strokes is reduced or minimized.

FIG. 10 is a diagram illustrating a third example concerning the correcting operation. This third example concerns an operation of drawing a plurality of strokes sequentially with use of the electronic pen 14. Suppose, for example, a case where a certain user quickly writes a character 120 with unstable pen pressure. When drawing strokes 121, 122, and 123 while moving the electronic pen 14, the user has a tendency to write the last stroke 123 entirely with reduced pen pressure, resulting in a reduced line width.

Thus, if the user performs a similar operation in the situation illustrated in FIG. 10 after learning concerning the aforementioned habit of the user is performed, an event of "inconsistency in pen pressure between strokes" is detected by the event detection section 68. As a result, if the user, when drawing strokes 131, 132, and 133 that constitute a character 130, writes the last stroke 133 entirely with reduced pen pressure, the information correction section 70 corrects the writing information 72 such that the pen pressure corresponding to the stroke 133 is increased entirely. This enables the user to proceed to a next writing operation without performing the undo operation.

Note that, although the third example described above assumes the case where inconsistency in the level of pen pressure between a plurality of strokes occurs, an embodiment of the present disclosure is applicable to a case where inconsistency in the level of pen pressure occurs within a single stroke. For example, in the case where discrete data of pen pressure values is converted into continuous data through interpolation, the information correction section 70 may reduce or minimize the inconsistency in the level of pen pressure by using a smoother interpolation function to obtain the continuous data. In addition, in the case where the range of pen pressure applied by the user is relatively narrow, the information correction section 70 may change the setting of the pen pressure curve so as to enlarge the dynamic range of pen pressure values.

Fourth Example

In the case where each of the first to third operations is a palette operation of selecting a color corresponding to a position indicated within a color palette 140, and the writing setting information 74 includes color information regarding colors in the color palette 140, the information correction section 70 may correct the color information such that a color at a position different from the position indicated by the palette operation is selected.

FIG. 11 is a diagram illustrating a fourth example concerning the correcting operation. This fourth example concerns an operation of selecting a color to be used in drawing from within the color palette 140. Suppose, for example, a case where a certain user has a particular favorite color. When selecting the favorite color while moving the electronic pen 14, the user has a tendency to select a color patch 142 adjacent thereto by mistake.

Thus, if the user performs a similar operation in the situation illustrated in FIG. 11 after learning concerning the aforementioned habit of the user is performed, an event of "a mistake in color selection" is detected by the event detection section 68. As a result, even when the user, intending to select the particular color within the color palette 140, selects the different color patch 142 by mistake, the information correction section 70 corrects the writing setting information 74 such that a color patch 144 having the particular color is selected. This enables the user to proceed to a next writing operation without performing the undo operation.

Note that, although the fourth example described above assumes the case where one color is selected from within the color palette 140, the number of colors to be selected may be two or more. In this case, the information correction section 70 changes at least one of a plurality of colors to correct a combination of colors to be used in drawing. Alternatively, on the basis of learning information representing a result of learning concerning a combination of a color canceled and a color selected after the cancel, the information correction section 70 may correct the writing setting information 74 so as to add a color that the user is likely to use next upon selection of a color.

Fifth Example

In the case where each of the first to third operations is a stroke operation of drawing strokes, and the writing information 72 includes a set of coordinate values representing a change over time of the position indicated by the electronic pen 14, the information correction section 70 may correct the set of coordinate values so as to erase a stroke used for drafting after a part or whole of content is completed through the stroke operation. Alternatively, the information correction section 70 may correct the writing information 72 so as to add a drawing effect corresponding to "application of an eraser" to the stroke after a part or whole of the content is completed through the stroke operation.

Note that, although the fifth example described above assumes the case where a part or whole of the stroke is eliminated, an object to be eliminated is not limited to stroke. For example, the information correction section 70 may correct the writing information 72 so as to eliminate a portion that is not a drawn object, such as a finger or palm of the user.

Sixth Example

Note that, although the first to fifth examples described above assume the case where the information correction section 70 corrects the writing information 72 or the writing setting information 74 whenever an event is detected, the information correction section 70 may alternatively correct the writing information 72 or the writing setting information 74 only when a particular condition is satisfied. Examples of such conditions include 1) a condition that the feature has been "enabled" through a user operation, and 2) a condition that the user is presumed to be irritated. The degree of irritation is estimated, for example, on the basis of the speed of movement of the electronic pen 14, how the electronic pen 14 is being held, and so on.

Effects Achieved by Embodiment

As described above, the information processing system 10 according to this embodiment includes the user device 12, and the server device 16, which transmits the learning information (here, the second parameter group 46) toward the user device 12 in response to a request from the user device 12.

In addition, the user device 12, which is an information processing device according to this embodiment, includes: the operation acceptance section 64 which accepts a cancel operation for canceling the first operation performed through the input device (here, the electronic pen 14) used for writing input; the information acquisition section 66 which acquires the learning information (here, the second parameter group 46) representing the result of learning about the relation between the content of the first operation and the content of the second operation performed through the electronic pen 14 after the cancel operation accepted by the operation acceptance section 64; and the information correction section 70 which corrects the writing information 72 representing a writing product corresponding to the third operation performed through the electronic pen 14 or the writing setting information 74 concerning a setting at the time of writing corresponding to the third operation, on the basis of the second parameter group 46 acquired by the information acquisition section 66.

Moreover, in each of an information processing method and an information processing program according to this embodiment, one or a plurality of computers (or processors) perform: an acceptance act of accepting a cancel operation for canceling the first operation performed through the input device (i.e., the electronic pen 14) used for writing input; an acquisition act of acquiring the learning information (i.e., the second parameter group 46) representing the result of learning about the relation between the content of the first operation and the content of the second operation performed through the electronic pen 14 after the accepted cancel operation; and a correction act (SP38 in FIG. 7) of correcting the writing information 72 representing a writing product corresponding to the third operation performed through the electronic pen 14 or the writing setting information 74 concerning a setting at the time of writing corresponding to the third operation, on the basis of the acquired second parameter group 46. Furthermore, a recording medium (or a storage medium) according to this embodiment is a non-transitory computer-readable medium having the above-described program stored therein.

As described above, the writing setting information 74 or the writing information 72 concerning the third operation is corrected on the basis of the learning information representing the result of learning about the relation between the content of the first operation and the content of the second operation performed through the input device after the accepted cancel operation, and thus, this correction reflects the cancel operation performed in the past. This enables various types of information obtained through a writing operation with use of the input device to be automatically corrected at an appropriate time.

In addition, in the case where each of the first to third operations is a switch operation of pressing the switch 14s for changing the setting at the time of writing, the information correction section 70 may correct the writing setting information 74 such that an event that accompanies the switch operation will start earlier or later than the time when the switch operation is performed. This will eliminate the need to perform a cancel operation even when the switch 14s has been pressed at a wrong time.

Further, in the case where each of the first to third operations is a stroke operation of drawing a stroke, and the writing information 72 includes a set of coordinate values representing a change over time of the position indicated by the input device, the information correction section 70 may correct the set of coordinate values such that inconsistency in positions of the same stroke is reduced or minimized. This will eliminate the need to perform a cancel operation even when positional inconsistency has occurred at the time of drawing a stroke.

Furthermore, in the case where each of the first to third operations is a stroke operation of drawing strokes, and the writing information 72 includes a set of pen pressure values representing a change over time of pen pressure acting on the input device, the information correction section 70 may correct the set of pen pressure values such that inconsistency in the level of the pen pressure between the strokes is reduced or minimized. This will eliminate the need to perform a cancel operation even when inconsistency in pen pressure has occurred at the time of drawing strokes.

Furthermore, in the case where each of the first to third operations is a palette operation of selecting a color corresponding to a position indicated within the color palette 140 and the writing setting information 74 includes color information regarding colors in the color palette 140, the information correction section 70 may correct the color information such that a color at a position different from the position indicated by the palette operation is selected. This will eliminate the need to perform a cancel operation even when a wrong position has been indicated at the time of selecting a color within the color palette 140.

Furthermore, in the case where the event detection section 68 detects whether or not an event for which the cancel operation may be performed has occurred and the type of any detected event from a current state of writing through the input device, the information correction section 70 may correct the writing information 72 or the writing setting information 74 according to the type of the event detected by the event detection section 68. Furthermore, in the case where the input device is the electronic pen 14, each of the first to third operations may be a whole operation performed from a pen-down operation to a pen-up operation on the electronic pen 14.

Furthermore, the information acquisition section 66 may acquire the learning information (i.e., the second parameter group 46) corresponding to the identification information of the electronic pen 14. This will enable correction appropriate for the user of the electronic pen 14 to be performed.

Furthermore, the cancel operation may be an undo operation that cancels an immediately previous operation, or an erase operation that erases at least a portion of a drawn object. This will increase the likelihood that an intention of the user to cancel an operation will properly be accomplished.

EXAMPLE MODIFICATIONS

It is needless to say that the present disclosure is not limited to the above-described embodiments and that various modifications can be made thereto without departing from the gist of this disclosure. Also note that various features thereof may be combined arbitrarily as long as no technical conflict arises. Also note that the order in which the acts of each flowchart are performed may be changed as appropriate as long as no technical conflict arises.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An information processing device comprising:

a processor; and a memory storing instructions that, when executed by the processor, cause the information processing device to:

accept a cancel operation that cancels a first operation performed through an input device that, in operation, performs writing input;

acquires learning information representing a result of learning about a relation between content of the first operation and content of a second operation performed through the input device after the cancel operation is accepted; and correct writing setting information concerning a setting of a device driver at a time of writing corresponding to a third operation performed through the input device, based on the learning information, wherein the setting of the device driver includes an identifier of the input device or a type of the input device.

2. The information processing device according to claim 1, wherein:

the input device is an electronic pen, each of the first operation, the second operation, and the third operation is a switch operation of pressing a switch of the electronic pen for changing the setting at the time of writing, and the instructions, when executed by the processor, cause the information processing device to correct the writing setting information such that an event that accompanies the switch operation will start earlier or later than a time when the switch operation is performed.

3. The information processing device according to claim 1, wherein:

each of the first operation, the second operation, and the third operation is a stroke operation of drawing a stroke, the writing setting information is generated based on use of the input device and includes a set of coordinate values representing a change over time of a position indicated by the input device, and the instructions, when executed by the processor, cause the information processing device to correct the set of coordinate values such that inconsistency in positions of a same stroke is reduced or minimized.

4. The information processing device according to claim 1, wherein:

each of the first operation, the second operation, and the third operation is a stroke operation of drawing strokes, writing setting information is generated based on use of the input device and includes a set of pen pressure values representing a change over time of pen pressure acting on the input device, and the instructions, when executed by the processor, cause the information processing device to correct the set of pen pressure values such that inconsistency in level of the pen pressure between the strokes is reduced or minimized.

5. The information processing device according to claim 1, wherein:

each of the first operation, the second operation, and the third operation is a palette operation of selecting a color corresponding to a position indicated within a color palette, the writing setting information includes color information regarding colors in the color palette, and the instructions, when executed by the processor, cause the information processing device to correct the color information such that a color at a position different from the position indicated by the palette operation is selected.

6. The information processing device according to claim 1, wherein the instructions, when executed by the processor, cause the information processing device to:

detect whether an event for which the cancel operation may be performed has occurred and a type of any detected event from a current state of writing through the input device, and correct the writing setting information according to the type of the event detected.

7. The information processing device according to claim 1, wherein:

the input device is an electronic pen, and each of the first operation, the second operation, and the third operation is a whole operation performed from a pen-down operation to a pen-up operation on the electronic pen.

8. The information processing device according to claim 7, wherein:

the instructions, when executed by the processor, cause the information processing device to acquire the learning information corresponding to identification information of the electronic pen.

9. The information processing device according to claim 1, wherein:

the cancel operation is an undo operation that cancels an immediately previous operation, or an erase operation that erases at least a portion of a drawn object.

10. The information processing device according to claim 1, wherein:

the setting of the device driver includes a shape of a pen pressure curve; and the instructions, when executed by the processor, cause the information processing device to enlarge a dynamic range of pen pressure values detected by the input device using the pen pressure curve.

11. An information processing method performed by one or more of computers, comprising:

accepting a cancel operation that cancels a first operation performed through an input device that performs writing input;

acquiring learning information representing a result of learning about a relation between content of the first operation and content of a second operation performed through the input device after the cancel operation is accepted; and correcting writing setting information concerning a setting of a device driver at a time of writing corresponding to a third operation, based on the learning information, wherein the setting of the device driver includes an identifier of the input device or a type of the input device.

12. The information processing method to claim 11, wherein:

the setting of the device driver includes a shape of a pen pressure curve, and the method further includes enlarging a dynamic range of pen pressure values detected by the input device using the pen pressure curve.

13. An information processing system comprising:

an information processing device including:

a processor; and a memory storing instructions that, when executed by the processor, cause the information processing device to:

accept a cancel operation that cancels a first operation performed through an input device that, in operation, performs writing input, acquire learning information representing a result of learning about a relation between content of the first operation and content of a second operation performed through the input device after the cancel operation is accepted, and correct writing setting information concerning a setting of a device driver at a time of writing corresponding to a third operation, based on the learning information, wherein the setting of the device driver includes an identifier of the input device or a type of the input device; and a server device that, in operation, transmits the learning information to the information processing device in response to a request from the information processing device.

14. The information processing system according to claim 13, wherein:

the setting of the device driver includes a shape of a pen pressure curve; and the instructions, when executed by the processor, cause the information processing device to enlarge a dynamic range of pen pressure values detected by the input device using the pen pressure curve.

* * * * *